Aug. 21, 1934.   G. M. SILLING   1,971,238
AVERAGE SPEED COMPUTING MEANS
Filed Dec. 4, 1933
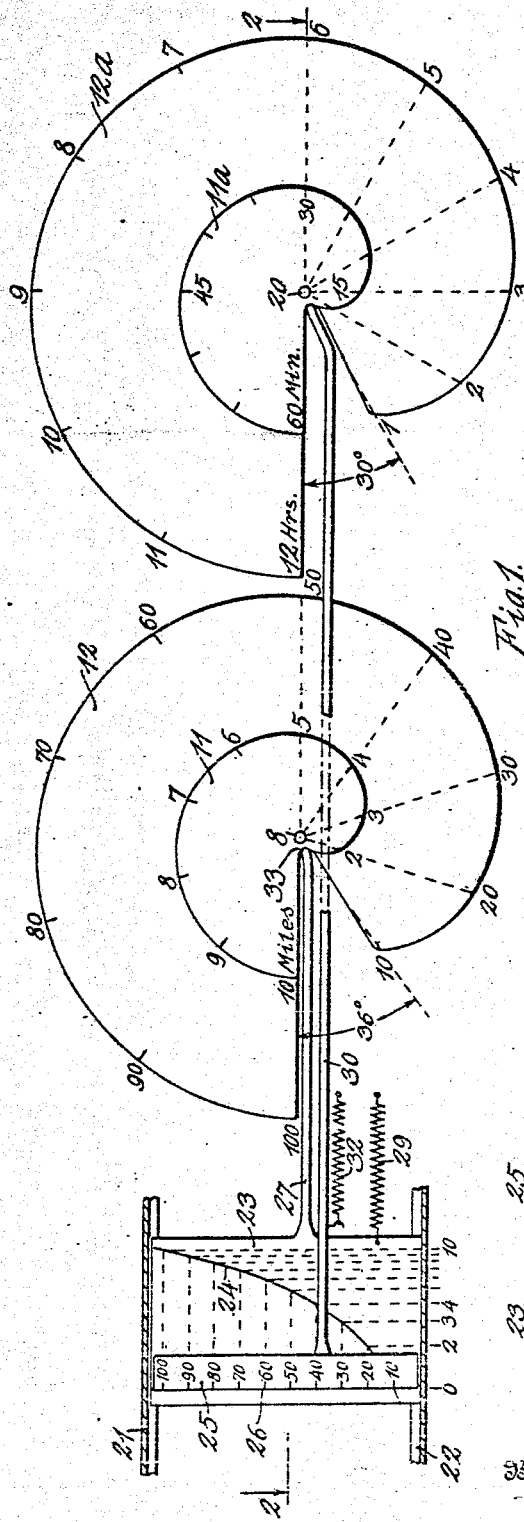
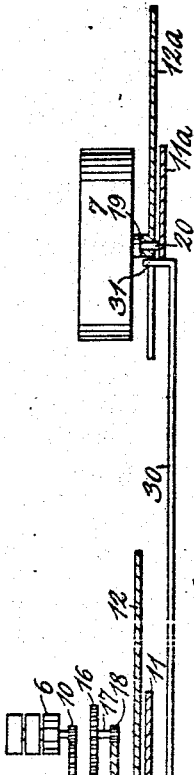
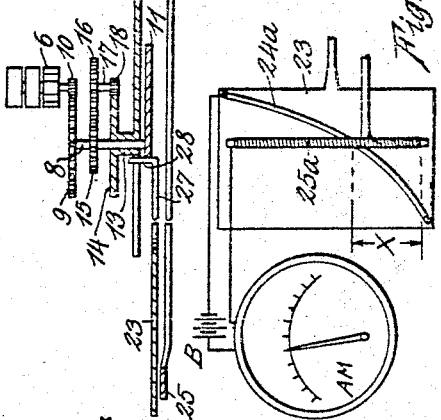
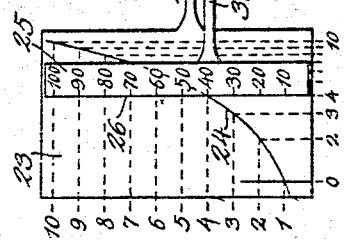
Inventor
George M. Silling.
By A. J. O'Brien
Attorney Patented Aug. 21, 1934

1,971,238

UNITED STATES PATENT OFFICE 1,971,238

AVERAGE SPEED COMPUTING MEANS

George M. Silling, Carbondale, Colo.

Application December 4, 1933, Serial No. 700,816

3 Claims. (Cl. 235—61)

This invention relates to improvements in average speed computing means for use with automotive vehicles and other machines that move at a variable speed.

The ordinary speedometer employed with automotive vehicles indicate the speed at any instant, but does not indicate the average speed for any length of time.

It is the object of this invention to produce an instrument that will indicate the average speed for a period of time and which, when used in connection with an automobile, will give the average speed for any ordinary trip.

The speed at which an object moves is a function of space and time and is equal to the distance traversed divided by the time. If the distance traversed in a time $T$ is indicated by $D$ and the speed or time rate by $V$ then $V=D \div T$. It is evident that an instrument like the present odometer can be used to measure the distance traveled while a clock will measure the time and it therefore becomes necessary to invent an instrument which shall be controlled both by a clock and an odometer in such a way that quotient of $D \div T$ can be read on a scale or dial.

It is well understood by mathematicians that division can be performed by means of logarithms and the difference between the log of the dividend and that of the divisor is the log of the quotient; thus, $D \div T = V$ is solved as follows:

$$\log D - \log T = \log V.$$

In order to perform mechanically the subtraction of the two logarithms in the manner indicated, it is only necessary to provide a scale having the logarithms to the base 10 indicated thereon and to move the same by means of a cam in such a way that the distance the scale moves corresponds to the logarithm of the distance traveled by the vehicle; the distance that the scale moves will then represent log $D$. To obtain the logarithm of $V$ it is necessary to subtract from log $D$ the logarithm corresponding to the time $T$ and this is accomplished by another cam which moves a pointer over the logarithmic scale in such a way that the relative movement of the scale and the pointer indicates the logarithm of the speed and thereby performs the operation necessary to solve the problem log $D - \log T = \log V$.

The apparatus that forms the subject of this invention will now be described in detail and for this purpose reference will be had to the accompanying drawing in which it has been illustrated and in which:

Fig. 1 is a diagrammatic view showing the arrangement of the several parts in side elevation;

Fig. 2 is a section taken on line 2—2, Fig. 1;

Fig. 3 is a side view of the indicator showing the scale and pointer in another position;

Fig. 4 is a view showing an electrically operated indicator; and Fig. 5 is a section showing the time and distance operated cams aligned to rotate about the same axis.

In the drawing numeral 6 designates the dial of an odometer which turns once for each mile traveled and reference numeral 7 designates a clock. A shaft 8 is mounted for rotation in suitable bearings and has attached to one end thereof a spur gear that is in mesh with a pinion 10 secured to the same shaft as the odometer disk 6; gear 9 has ten times as many teeth as pinion 10 and the gear ratio is therefore 10 to 1. Secured to the opposite end of shaft 8 is a cam 11 whose cam surface is a logarithmic curve as will hereinafter appear. Mounted for rotation on shaft 8 is a cam 12 whose cam surface is also a logarithmic curve, but whose radii are longer than the corresponding radii of the cam 11 by an amount equal to log 10 laid off on the scale used for cam 11. Cam 12 has a hub 13 to one end of which is secured a spur gear 14, a spur gear 15 is secured to shaft 8 and this is in mesh with an identical spur gear 16 secured to shaft 17. Attached to shaft 17 is a pinion 18 that is in mesh with spur gear 14 which has ten times as many teeth as the pinion 18. Since gears 15 and 16 are the same size, shaft 17 will rotate at the same speed as shaft 8 and since pinion 18 has one-tenth as many teeth as spur gear 14, cam 12 will rotate one-tenth as fast as cam 11, but in the same direction.

Clock 7 has an hour spindle 19 and a minute spindle 20. A cam 12a, which is similar to cam 12, and a cam 11a, which is similar to cam 11, are connected respectively to the hour spindle 19 and the minute spindle 20; cam 11a will therefore make one complete revolution in one hour and cam 12a a complete revolution in twelve hours.

Located to one side of cams 11 and 12 are two guides 21 and 22 between which is mounted a flat slide 23 on the surface of which is plotted a logarithmic curve 24. Another slide 25 is also mounted in the guides 21 and 22 and lies in contact with the surface of slide 23. The straight edge 26 of the slide 25 serves to indicate the reading by its position on the curve 24. A pusher bar 27 has one end attached to the slide 23 and has its other end bent at right angles to form a pin 28 which extends across the planes of both cams 11 and 12. A tension spring 29 has one end attached to the slide 23 and serves to hold the pin 28 against the periphery of the cam with which it cooperates. A pusher bar 30, similar to pusher bar 27, has one end attached to the slide 25 and the other bent to form a pin 31 that corresponds to pin 28 on bar 27. Pin 31 cooperates with cams 11a and 12a and moves the straight edge against the tension of the spring 32 when the cams are rotated by the clock.

Cams 11 and 11a are identical in size and shape and cam 11 turns once while the vehicle travels ten miles while cam 11a turns once in one hour. Cam 11 has its point of origin at 33, which is as close to the center as possible because the distance from the center to the periphery represents the log of one, which is zero; it is not practical to cut away all of the metal and this point is therefore not accurately located. When the vehicle has traveled two miles the point marked 2 will be in contact with pin 28 and since the distance from the center to the periphery is the log of 2, to the scale employed, the slide 23 will be moved towards the left a distance equal to the log of 2 and if the straight edge remains stationary, the point on curve 24 will intersect line 26 at 20.

If the time controlled cams are set in motion at the same time that the vehicle starts, cam 11a will be rotated to an extent corresponding to the time elapsed and will move the pointer 25 towards the left, or in the direction in which the scale 23 is moving and this has the effect of subtracting the log of the elapsed time from the log of the number of miles traveled and the relative movement of the curve 24 and the straight edge will be the log of the quotient, or of the average speed. When cam 11 has rotated one complete revolution, cam 12 has turned through an angle of 36 degrees and the pin 28 will be transferred to the periphery of cam 12. When cam 11a has made one complete turn, pin 31 will be transferred to the periphery of cam 12a. Cams 12 and 12a are the same shape as cams 11 and 11a, respectively, and differ from them merely in this, that the corresponding radii of cams 12 and 12a are longer by the logarithm of 10 to the scale employed.

It is evident that when the vehicle moves, the instrument will continue to subtract the log of the number of hours elapsed from the log of the number of miles traveled and the difference can be read on the scale 23.

In Fig. 3 the position of the scale and the straight edge have been shown at the end of one-half an hour and after the vehicle has traveled twenty miles, the position of the parts shown in Fig. 3 will also be the same if the vehicle has traveled eighty miles in two hours.

If the vehicle stands still the straight edge will continue to be moved by the clock operated cam and will reduce the average speed for the trip.

Since the scale on the straight edge has equal divisions, it is evident that it can be replaced by an electrical resistance 25a and that a metal conductor 24a can be bent to correspond to the curve 24. If the resistance and the electrical conductor are so positioned that they will always be in contact at the point of intersection, the resistance of the portion X will represent the average speed. If an ammeter AM and a battery B are connected in series with the resistance 25a and the conductor 24a the current flowing through the ammeter will vary directly with X and the ammeter can therefore be calibrated to read the average speed.

In Fig. 5 an arrangement has been shown in which the axes about which cams 11, 12 and 11a, 12a rotate are aligned and this is the preferable construction. The arrangement illustrated in Figs. 1 and 2 is merely for convenience in explaining the invention and its operation.

In the claims, the term "logarithmic cam" will be used and this refers to a cam whose periphery is a curve whose radii are the logarithms of numbers from zero to 10 or such logarithms plus the distance corresponding to the characteristic of the number.

Attention is called to the fact that if the clock operated cams are not operating the device becomes an odometer and registers the distance traveled only.

In the drawing the vehicle has not been shown, but the odometer disk 6 is driven directly from the vehicle and is therefore to be considered as part of the vehicle and represents the latter in the disclosure.

In the above part of the specification, the statement is made that cams 12 and 12a are similar. This refers to the fact that the length of the radii corresponding to the same number of miles and hours are of equal length, but since cam 12 makes one revolution in ten miles, while cam 12a makes one revolution in twelve hours, the space between adjacent unit radii is 36 degrees in the former and 30 degrees in the latter. The logarithms of 11 and 12 hours is, of course, greater than the log of 10 and therefore cam 12a is slightly larger than cam 12, due to the contraction of the unit spaces.

Having described the invention what is claimed as new is:

1. An instrument for determining the average speed of travel of a vehicle comprising, in combination, a member which is rotated through an angle proportional to the distance traveled, a logarithmic cam operatively connected to the said member by means which produces a complete rotation of the cam while the vehicle travels ten miles, a second logarithmic cam mounted for rotation about an axis concentric with the axis of the first cam, means interposed between the rotatable member and the second cam for rotating it at one-tenth the speed of the first cam, the radii of the second cam being longer than the corresponding radii of the first cam by an amount equal to the logarithm of 10 to the scale employed, a movable member provided with a curve whose ordinates and abscessas are respectively numbers and their logarithms, means for moving the member having the curve, comprising a push bar and a pin that extends across the planes of the cams, two other logarithmic cams mounted to rotate about a common axis, and both driven from a clock, the smaller cam rotating once each hour and the larger one once every twelve hours, a straight edge mounted for relative movement with respect to the curve on the movable member, and means comprising a push bar and a pin for moving the pointer, the pin extending across the planes of both cams whereby it will be moved first by the smaller cam and then by the larger cam.

2. An instrument for determining the average speed of a vehicle which travels at a variable speed comprising, in combination, a logarithmic cam rotated through an angle proportional to the distance traveled by the vehicle, a smaller logarithmic cam mounted to rotate about the same axis as the first cam but at a rate ten times as fast as the first cam, the two cams being so related that the radii of the first and larger cam are longer than the corresponding radii of the smaller cam by an amount equal to the logarithm of 10 to the scale employed, a logarithmic scale mounted for movement in a plane, means operatively associated with the curve and the cams for moving it first in response to the smaller cam and then in response to the movement of the larger cam, a movable straight edge operatively associated with the curve, a logarithmic time controlled cam constructed to the same scale as the other cam, a clock mechanism for rotating the time controlled cam, and means for moving the straight edge in accordance with the time controlled cam whereby the position of the straight edge relative to the curve will indicate the logarithm of the average speed of the vehicle for the time elapsed.

3. An instrument for determining the average speed of a vehicle which travels at a variable speed comprising, in combination, a logarithmic cam rotated through an angle proportional to the distance traveled by the vehicle; a smaller logarithmic cam mounted to rotate about the same axis as the first cam but at a rate ten times as fast as the first cam, the two cams being so related that the radii of the first and larger cam are longer than the corresponding radii of the smaller cam by an amount equal to the logarithm of 10 to the scale employed, a logarithmic scale mounted for movement in a plane, means operatively associated with the curve and the cams for moving it first in response to the smaller cam and then in response to the movement of the larger cam, a clock mechanism having an hour hand spindle that rotates 360 degrees in twelve hours and a minute spindle that rotates 360 degrees in one hour, a logarithmic cam constructed to the same scale as the first mentioned cam and secured to the hour spindle so as to rotate therewith, the radii of the cam representing the logarithms of numbers from zero to twelve spaced so as to embrace a complete circle, a smaller logarithmic cam secured to the minute spindle so as to rotate therewith, the radii of the last mentioned cam representing the logarithm of the numbers from zero to sixty, the scale being such that the radius of the smaller time controlled cam representing sixty minutes is equal to the radius of the larger time controlled cam which represents one hour, a straight edge movably associated with the curve and means for moving the straight edge in accordance with the position of the time controlled cams whereby the position of the straight edge relative to the curve indicates the logarithm of the average time rate at which the vehicle travels during the time interval.

GEORGE M. SILLING.